Figure 1:
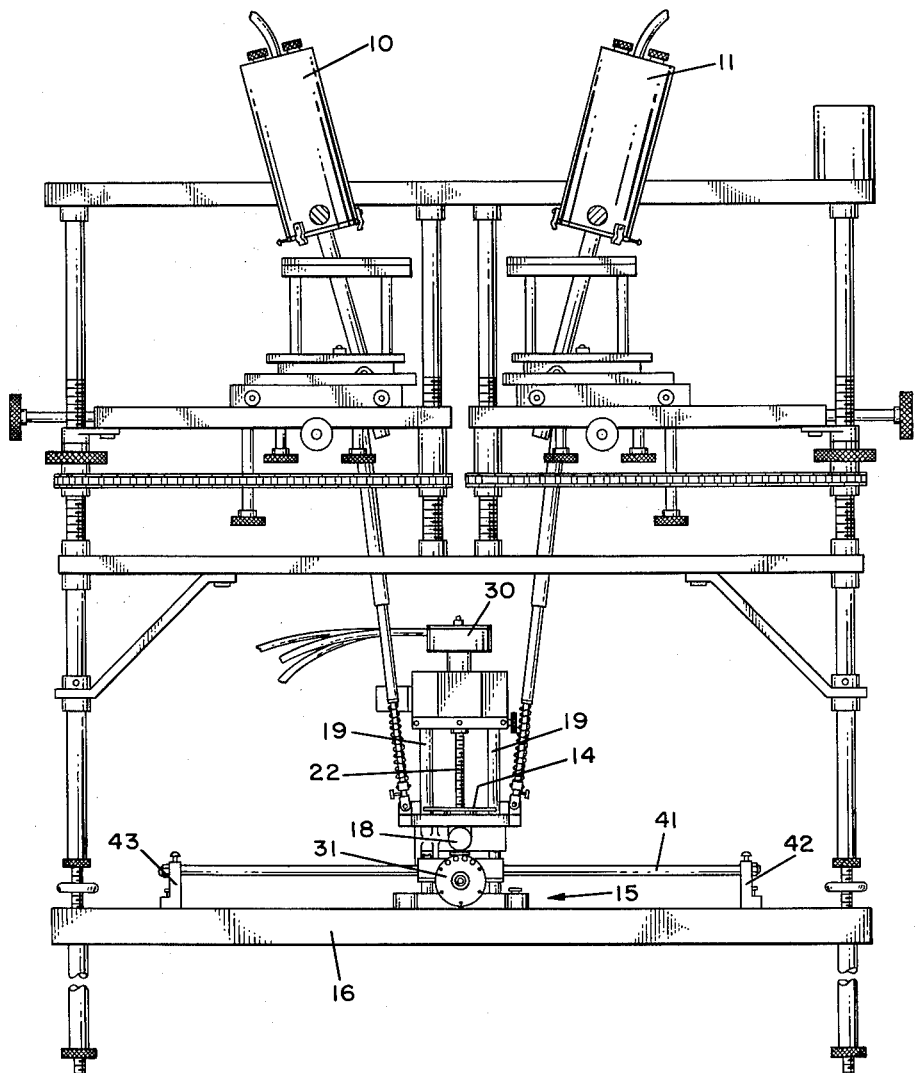

INVENTOR.
EVERTT S. PRESTON

March 27, 1962 E. S. PRESTON 3,026,766
APPARATUS FOR MEASURING AND RECORDING TERRAIN DATA
Filed Aug. 14, 1957 4 Sheets-Sheet 2
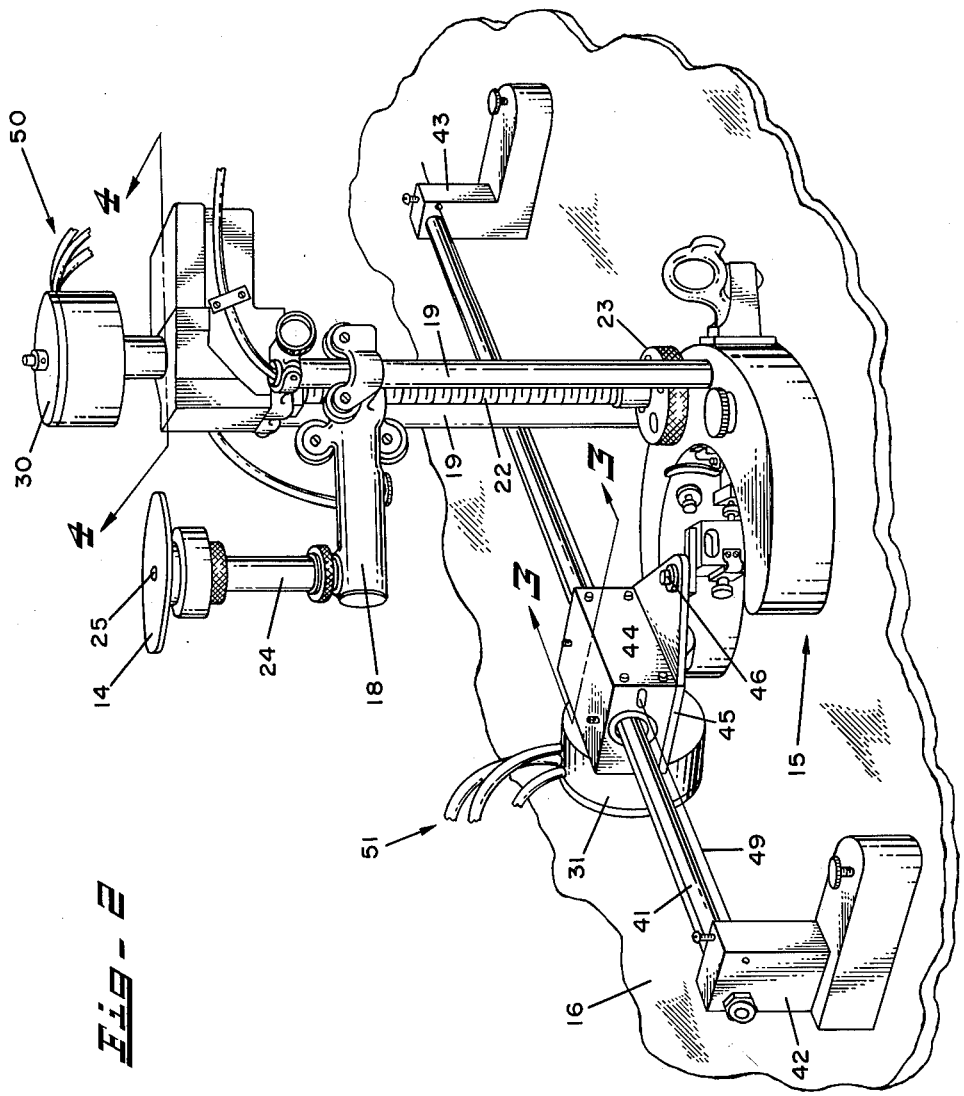
INVENTOR.
EVERTT S. PRESTON
BY
ATTORNEY.

March 27, 1962     E. S. PRESTON     3,026,766
APPARATUS FOR MEASURING AND RECORDING TERRAIN DATA
Filed Aug. 14, 1957     4 Sheets-Sheet 3
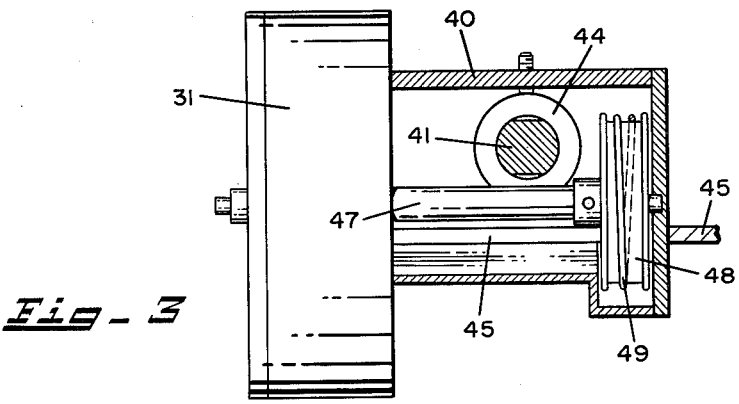
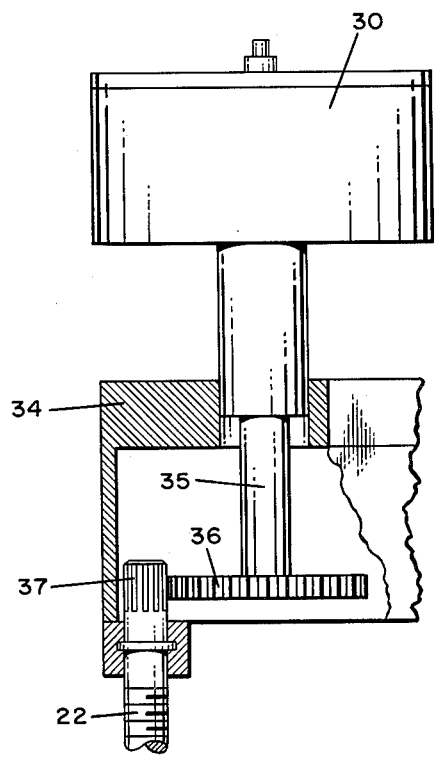
INVENTOR.
EVERETT S. PRESTON
BY
ATTORNEY.

March 27, 1962 E. S. PRESTON 3,026,766
APPARATUS FOR MEASURING AND RECORDING TERRAIN DATA
Filed Aug. 14, 1957 4 Sheets-Sheet 4
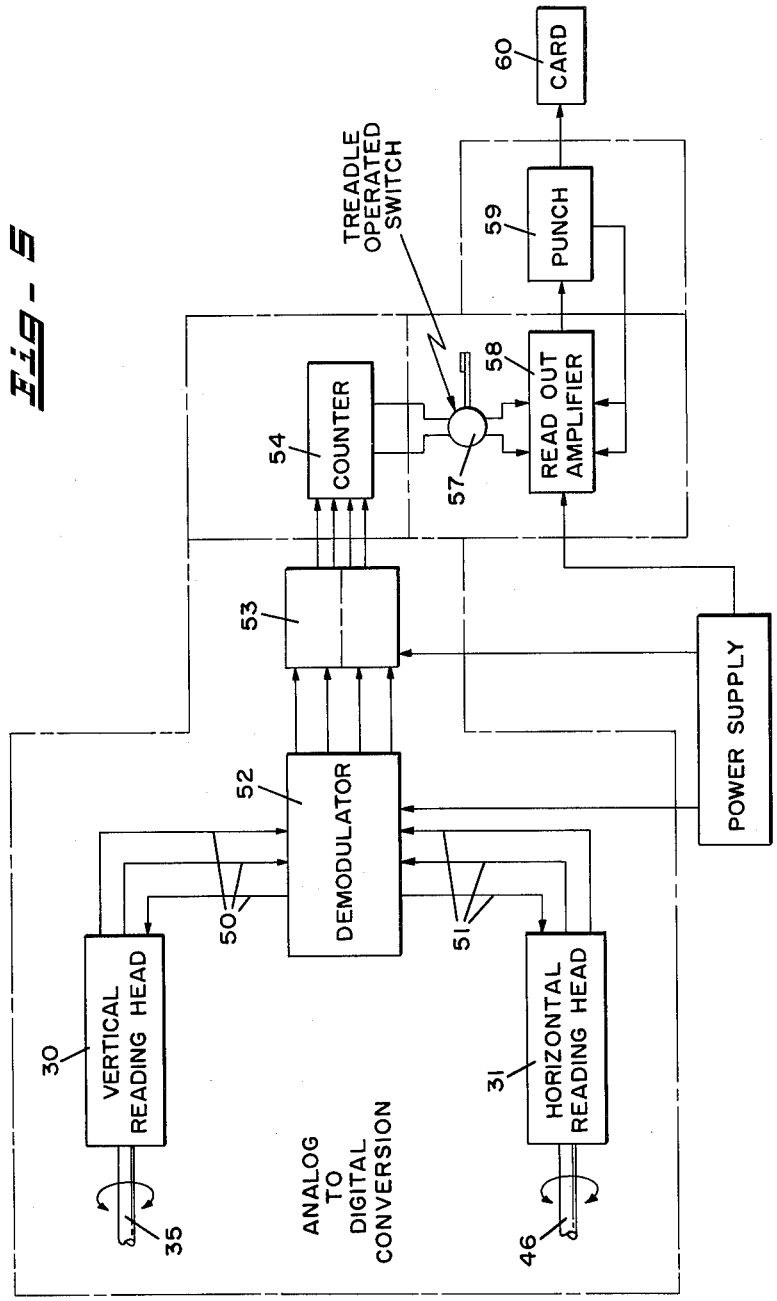
INVENTOR.
EVERTT S. PRESTON
BY
ATTORNEY.

United States Patent Office 3,026,766
Patented Mar. 27, 1962

3,026,766
APPARATUS FOR MEASURING AND RECORDING TERRAIN DATA
Everett S. Preston, Upper Arlington, Ohio, assignor to Photoronix, Inc., Columbus, Ohio, a corporation of Ohio
Filed Aug. 14, 1957, Ser. No. 678,116
3 Claims. (Cl. 88—24)

The present invention relates to apparatus for computing earth working projects by the use of aerial photogrammetry and electronic computing machines or other high speed data processing equipment, and is particularly useful, as an example, in the design and computation of cuts and fills in the construction of highways.

Prior to the present invention, it was the practice in the construction of roadways and the like, to make aerial stereoscopic photographs of the proposed roadway and then by the use of a stereoscopic projector known as the "Kelsh Plotter," which is the subject of U.S. Patent #2,492,870, coordinates representing cross sections of the earth along the proposed roadway could be made by taking vertical readings from the plotter at pre-selected points or stations along the roadway and laterally of the center-with a scale the distance from the center line of the projected roadway and the conversion of the measurements to foot readings to obtain the coordinate points at a particular station. By determining the cross-sectional areas at closely spaced stations along the proposed highway and comparing these with the cross-sectional areas of the finished highway the volumes of cuts or fills for the new could be calculated. This method is slow, laborious and subject to inaccuracies.

The present invention is concerned with an improvement on the type of stereoscopic projection instrument mentioned wherein both the vertical elevation and horizontal distances readings of the terrain sections are automatically recorded in a manner which can be readily used in computing machines to calculate the volumes of the cuts and fills, thereby greatly increasing the accuracy of the measurements and readings and substantially reline thereof. This procedure entailed measuring manually ducing engineers' time to provide the specifications for roadway projects.

More specifically, the invention resides in the improvement of a stereoscopic instrument of the type having a screen or platen onto which stereoscopic images are projected, means identifying a point on the platen, the point and images being shiftable relative to one another in the plane of the platen by means including a movable member to identify any given point on the superimposed images, means including a second movable member to bring the images into focus on the platen at the identifying point, in combination with means to record automatically the positions of the two movable members from time to time with reference to a given position, which recordings are preferably of the type which can be used in computing machines to calculate the ultimate data desired, as mentioned previously.

Another object of the invention is the provision of a device for the plotting table of a stereoscopic projector of the type mentioned comprising a bar forming a guide along which the plotting table may be moved and means driven by relative movement of the plotting table and bar to indicate or record the direction and extent of such relative movement. In the preferred embodiment of the invention the indicating means produces electric impulses which are utilized to actuate suitable counters to automatically record or punch the linear readings indicated by the electric impulses on a card which can be used in electronic computers.

Other objects and advantages of the invention will be apparent from the following description of a preferred embodiment thereof, reference being made to the accompanying drawings wherein FIG. 1 is a front elevational view of a stereoscopic projection instrument embodying the invention;

FIG. 2 is a perspective view of the plotter-reading table of the instrument shown in FIG. 1, but on a larger scale;

FIGS. 3 and 4 are sectional views, on a larger scale, taken along lines 3—3 and 4—4, respectively, in FIG. 2; and FIG. 5 is a diagrammatic showing of the electrical impulse generator and counting system and the card punching machine operated thereby.

Referring to FIG. 1 of the drawings, a stereoscopic projection map-making instrument, similar to that disclosed in U.S. Patent No. 2,492,870 to Kelsh, is shown embodying the invention and which machine comprises a frame supporting two projection lanterns 10, 11 each arranged to project a diapositive onto a platen or screen 14 of a plotting or reading table 15. If the diapositives are photographs made from an airplane of the terrain over which earth working is to be developed, such as a new road, the photographs are taken consecutively so that the superimposed images on platen 14 provide a stereoscopic effect and by vertical adjustment of the platen, given points of the images can be brought into focus, and according to the vertical position of the platen the elevation relative to a known elevation on the images can be accurately determined. This type of projection and elevation determination is well known in the art.

The plotting table 15 is arranged to slide on the flat surface of a map table 16 which is carried by the frame. As seen more clearly in FIG. 2, platen 14 is supported by a horizontally extending arm 18 which is guided vertically by two upright rods 19 rigidly attached to plotting table base 15. A micromatic screw 22, rotatably supported by the plotting table, may be manually rotated by a knob 23 to cause arm 18 to be raised or lowered and thereby raise the lower platen 14.

Platen 14 is attached to arm 18 by a stem 24 extending vertically from the outer end of arm 18 and an electric lamp (not shown) inside the stem projects a light through a pinpoint opening 25 in the center of the screen to provide a point of reference on the platen which may be brought into coincidence with any given point of the projected images of the diapositives as described hereinafter.

The projected images of the diapositives spread over a considerably wider area than that of platen 14 and by sliding the plotting table 15 over the surface of the map table 16 and adjusting the platen to the proper elevation, any portion of the diapositives may be brought into focus on the platen and in registration with the pinpoint opening 25. As is well known with the type of equipment described, the elevation of any point on the terrain shown on the projected diapositives can be determined by raising or lowering platen 14 by screw 22 to bring the given area of the projected images into focus at point 25, and by measuring the elevation of the platen and comparing that measurement with a known elevation of another area of the diapositives, the elevation of the area in question can be readily determined, as is well understood in the art.

The present invention contemplates automatically measuring and recording the movement of plotting table 15 over the surface of the map table 16 as well as vertical movements of platen 14, these measurements preferably being recorded simultaneously by suitable automatic recording equipment so that in use for road engineering, the elevations and horizontal measurements of any given points may be automatically recorded, for example on punch cards or tape, and used with similar records of the design profile desired to compute, by computting machine, the earth work volumes involved.

In the preferred form of the invention, the vertical movement of platen 14 in either direction is indicated by electrical impulses generated by a magnetic vertical reading head 30, which is driven by the screw 22, so that impulses corresponding to the extent and direction of rotation of the screw may be obtained and utilized by an electronic counter, as is described more fully hereinafter.

Similarly, the lateral movement of plotting table 15 on the surface of table 16 is indicated by electric impulses generated by a horizontal magnetic reading head 31 and similarly utilized by the electronic counter, as is described hereinafter. The vertical and horizontal magnetic reading heads are of similar construction and a suitable form is known as model 15A manufactured by The Whittaker Gyro Division of The Telecomputing Corporation, Dayton, Ohio.

As seen in FIG. 4, reading head 30 is mounted in an opening through the top wall of a housing 34 attached to rods 19 and has a drive shaft 35 depending into the housing and on which a gear 36 is attached, which gear is driven by a pinion 37 cut in the upper end portion of screw 22. It will be seen that as screw 22 is adjusted to bring platen 14 into proper alignment with the projected images, drive shaft 35 of reading head 30 is rotated to correspond to the vertical adjustments.

Referring to FIG. 3, horizontal reading head 31 is attached to a housing 40 which is slidingly supported on a guide bar 41, the ends of which are rigidly attached to standards 42, 43, as shown. The standards 42, 43 rest on the table 16 and may be shifted to support the bar 41 at right angles to the centerline of the proposed road. The weight of the bar 41 and standards prevent accidental shifting of the rod in normal use of the plotting table described hereinafter. The end walls of housing 40 have bushings 44 affixed therein which form bearings to guide the housing for sliding movement along the bar. The bottom wall 45 of the housing has an extension which is pivotally attached at 46 to the base of plotting table 15, as shown, for convenience in swinging bar 41 relative to the plotting table. The head 31 has a drive shaft 47 which is pivoted in the rear wall of housing 40 and a drum 48 is attached to the shaft and is driven by a wire or cable 49 reeved thereabout and attached at its ends to standards 42, 43. It will be seen that as the plotting table 15 is moved along rod 41 cable 49 rotates drum 48 and drive shaft 47 of the head 31 by which electrical impulses are produced by the head corresponding to the extent and direction of movement of the plotting table.

By taking the aerial photographs from a certain altitude and providing proper dimensions for the driving mechanisms for heads 30, 31, the heads will generate electrical impulses which may be modulated to correspond to each 1/10 foot of terrain over which the plotting table 15 is moved as well as an electrical impulse for each 1/10 foot change in elevation registered by adjustment of elevation of screen 14.

The magnetic heads 30, 31 are electrically connected by sets of wires 50, 51, respectively to a demodulator 52 which feeds electronic signals to the heads and, by magnetic coupling, signals are returned to the demodulator representing the amount and direction of rotation of the shafts. The demodulator feeds the signals to an amplifier input unit 53 which amplifies the signal which is then fed to a counter 54. The demodulator 52 and amplifying input unit 53 are available commercially, as, for example, from the Telecomputing Corporation of Burbank, California, and the counter 54 may be an electronic reversible counter, such as that known as the Berkely Reversible Electronic Counter Model 5604–11 manufactured by The Berkely Division of Beckman Instrument Company, Richmond, California. This counter preferably has two five-digit channels, operating independently from the output of the horizontal and vertical input units respectively. The digits of one channel give the horizontal movement readings in feet and the digits of the second channel to give the vertical movement in feet. The magnetic heads and counters may be similar to those described and referred to in U.S. Patent Number 2,765,459 issued to A. J. Winter. The reversible counter may be of the types disclosed in U.S. Patents Numbers 2,583,102 or 2,735,005.

The counter 54 is connected, through a treadle switch 57, with a suitable read-out amplifier 58 which controls a "526 IBM" punch card machine 59 manufactured by The International Business Machines Corporation and described in the publication of that corporation entitled "Customer Engineering Reference Manual, IBM Form 223–8941" copyrighted 1952, 1953. The punch card machine is a type which perforates cards, one of which is indicated at 60, in a coded manner for use in electronic computers which may perform various calculations desired, as is well understood in the art. The operator by closing the control switch 57 causes the card punch machine 59 to indicate automatically and simultaneously on a card, horizontal and vertical coordinates according to the impulses which have been fed to the counter by the vertical and horizontal reading heads, respectively. Each card may contain the coordinates for the cross section of the terrain at each station so that "terrain" cards so produced may be combined with design cards having punched portions which have data corresponding to coordinate points on the design template including the berm, ditches, side slopes and stake points, and processed in suitable computing machines for calculating the earthwork volumes, areas requiring seeding, slope stake information for field crews, and a mass diagram, as examples.

It is to be understood that any other suitable methods of recording the movements of the reading platen 14 and the plotting table 15 could be employed, if desired.

The invention may be utilized to provide information rapidly and accurately for the type of earthwork mentioned and for other similar projects which will readily occur to those skilled in the art, and while but one embodiment of the invention has been described other modifications or adaptations thereof may be used, all falling within the scope of the following claims.

I claim:

1. The combination of a photogrammetric instrument having projectors for projecting stereoscopic images, a platen onto which a portion of said images are projected, means to cause relative movement of said projectors and platen to move said platen both laterally of and generally parallel to the direction of projection of said images to bring given portions of said images into focus on said platen, counting means responsive to said lateral movements of said platen to indicate the extent of said lateral movements from a given position, counting means responsive to said generally parallel movements of said platen to indicate the extent of said parallel movements from a given position, registering means operative to record the counts of said counting means on a control element for a calculating machine, and means to actuate said registering means to record the counts of the respective counting means on the control element at one of any selected positions of said platen.

2. The combination of a photogrammetric instrument having projectors for projecting stereoscopic images, a map table onto which said images are projected, a plotting table supported on said map table and movable thereon, a platen on said plotting table onto which a portion of said images are projected, guide means on said map table to guide movements of said plotting table on said map table, elevating means on said plotting table to adjust the height of said platen relative to said map table to bring given portions of said images into focus on said platen, counting means driven by relative movement of said plotting table and said guide means, counting means driven by said elevating means, registering means operative to record the counts of said counting means on a control element for a calculating machine, and means to actuate said registering means to record the counts of the respective counting means on the control element at one of any selected positions of said plotting table and platen.

3. The combination of a photogrammetric instrument having projectors for projecting stereoscopic images, a map table onto which said images are projected, a plotting table supported on said map table and movable thereon, a platen on said plotting table onto which a portion of said images are projected, guide means on said map table including a bar arranged to be freely positionable on said table and pivotally connected with a part of said plotting table to guide movement of said plotting table along said bar, counting means including a rotatable drive member, means driven by movement of said plotting table along said bar to rotate said drive member according to movement of said plotting table along said bar, and digital registering means to record the counts of said counting means.

References Cited in the file of this patent
UNITED STATES PATENTS

| | | |
|---|---|---|
| 2,059,633 | Ferber | Nov. 3, 1936 |
| 2,184,159 | Stockbarger et al. | Dec. 19, 1939 |
| 2,492,870 | Kelsh | Dec. 27, 1949 |
| 2,574,123 | Santoni | Nov. 6, 1951 |
| 2,589,824 | Kuipers | Mar. 12, 1952 |
| 2,708,368 | Kolisch | May 17, 1955 |

OTHER REFERENCES

"Vertical Aerotriangulation Adjustment Utilizing Electronic Computers," Photogrammetric Engineering, vol. 22, September 1956, pages 664–666 (Born).

"Research Committee Report," Photogrammetric Engineering, vol. 23, April 1957, pages 358–370 (Doyle).